United States Patent
Paz et al.

(10) Patent No.: US 12,160,861 B2
(45) Date of Patent: Dec. 3, 2024

(54) CODE BLOCK GROUPING FOR FREQUENCY FIRST PER LAYER MAPPING

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/643,095

(22) Filed: Dec. 7, 2021

(65) Prior Publication Data

US 2023/0180230 A1 Jun. 8, 2023

(51) Int. Cl.
| | | |
|---|---|---|
| *H04W 72/12* | (2023.01) | |
| *H04L 1/1829* | (2023.01) | |
| *H04L 5/00* | (2006.01) | |
| *H04W 72/1273* | (2023.01) | |
| *H04W 72/23* | (2023.01) | |
| *H04L 1/1812* | (2023.01) | |

(52) U.S. Cl.
CPC ....... *H04W 72/1273* (2013.01); *H04L 1/1861* (2013.01); *H04L 5/0092* (2013.01); *H04W 72/23* (2023.01); *H04L 1/1812* (2013.01)

(58) Field of Classification Search
CPC .............. H04W 72/1273; H04W 72/23; H04L 1/1861; H04L 5/0092; H04L 1/1812
See application file for complete search history.

(56) References Cited

U.S. PATENT DOCUMENTS

| | | | | |
|---|---|---|---|---|
| 2019/0363843 | A1* | 11/2019 | Gordaychik | .............. H04L 1/08 |
| 2021/0112581 | A1* | 4/2021 | Hampel | ................ H04W 72/20 |
| 2021/0119848 | A1* | 4/2021 | Ibars Casas | .......... H04L 1/0052 |

FOREIGN PATENT DOCUMENTS

| | | | | |
|---|---|---|---|---|
| WO | WO-2018129017 | A2 * | 7/2018 | ........... H04L 1/0088 |
| WO | WO-2020034055 | A1 * | 2/2020 | ........... H04L 1/1861 |

OTHER PUBLICATIONS

International Search Report and Written Opinion—PCT/US2022/080636—ISA/EPO—Mar. 17, 2023.

* cited by examiner

*Primary Examiner* — Mewale A Ambaye
(74) *Attorney, Agent, or Firm* — Guang Yu Zhang; Harrity & Harrity, LLP

(57) ABSTRACT

Various aspects of the present disclosure generally relate to wireless communication. In some aspects, a receiving device may receive, via a multi-layer communication link, an indication of one or more parameters for grouping code blocks (CBs) of a transport block (TB) into CB groups (CBGs). The receiving device may receive the TB having multiple CBs mapped to resources of the TB in a frequency first per layer (FFPL) mapping configuration, wherein the CBGs include a CB received on a first layer and a CB received on a second layer of the multi-layer communication link. The receiving device may transmit hybrid automatic repeat request (HARQ)-acknowledgment (ACK) feedback for the CBGs based at least in part on the grouping of the CBs. Numerous other aspects are described.

30 Claims, 11 Drawing Sheets

CODE BLOCK GROUPING FOR FREQUENCY FIRST PER LAYER MAPPING

FIELD OF THE DISCLOSURE

Aspects of the present disclosure generally relate to wireless communication and to techniques and apparatuses for code block grouping for frequency first per layer mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a receiving device. The method may include receiving, via a multi-layer communication link, an indication of one or more parameters for grouping code blocks (CBs) of a transport block (TB) into CB groups (CBGs). The method may include receiving the TB having multiple CBs mapped to resources of the TB in a frequency first per layer (FFPL) mapping configuration, wherein the CBGs include a CB received on a first layer and a CB received on a second layer of the multi-layer communication link. The method may include transmitting hybrid automatic repeat request (HARQ)-acknowledgment (ACK) feedback for the CBGs based at least in part on the grouping of the CBs.

Some aspects described herein relate to a method of wireless communication performed by a transmitting device. The method may include transmitting, via a multi-layer communication link, an indication of one or more parameters for grouping CBs of a TB into CBGs. The method may include transmitting the TB having multiple CBs mapped to resources of the TB in a FFPL mapping configuration, wherein the CBGs include a CB transmitted on a first layer and a CB transmitted on a second layer of the multi-layer communication link. The method may include receiving HARQ-ACK feedback for the CBGs based at least in part on the grouping of the CBs.

Some aspects described herein relate to a receiving device for wireless communication. The receiving device may include a memory and one or more processors coupled to the memory. The one or more processors may be configured to receive, via a multi-layer communication link, an indication of one or more parameters for grouping CBs of a TB into CBGs. The one or more processors may be configured to receive the TB having multiple CBs mapped to resources of the TB in a FFPL mapping configuration, wherein the CBGs include a CB received on a first layer and a CB received on a second layer of the multi-layer communication link. The one or more processors may be configured to transmit HARQ-ACK feedback for the CBGs based at least in part on the grouping of the CBs.

Some aspects described herein relate to a transmitting device for wireless communication. The transmitting device may include a memory and one or more processors coupled to the memory. The one or more processors may be configured to transmit, via a multi-layer communication link, an indication of one or more parameters for grouping CBs of a TB into CBGs. The one or more processors may be configured to transmit the TB having multiple CBs mapped to resources of the TB in a FFPL mapping configuration, wherein the CBGs include a CB transmitted on a first layer and a CB transmitted on a second layer of the multi-layer communication link. The one or more processors may be configured to receive HARQ-ACK feedback for the CBGs based at least in part on the grouping of the CBs.

Some aspects described herein relate to a non-transitory computer-readable medium that stores a set of instructions for wireless communication by a receiving device. The set of instructions, when executed by one or more processors of the receiving device, may cause the receiving device to receive, via a multi-layer communication link, an indication of one or more parameters for grouping CBs of a TB into CBGs. The set of instructions, when executed by one or more processors of the receiving device, may cause the receiving device to receive the TB having multiple CBs mapped to resources of the TB in a FFPL mapping configuration, wherein the CBGs include a CB received on a first layer and a CB received on a second layer of the multi-layer communication link. The set of instructions, when executed by one or more processors of the receiving device, may cause the receiving device to transmit HARQ-ACK feedback for the CBGs based at least in part on the grouping of the CBs.

Some aspects described herein relate to a non-transitory computer-readable medium that stores a set of instructions for wireless communication by a transmitting device. The set of instructions, when executed by one or more processors of the transmitting device, may cause the transmitting device to transmit, via a multi-layer communication link, an indication of one or more parameters for grouping CBs of a TB into CBGs. The set of instructions, when executed by one or more processors of the transmitting device, may cause the transmitting device to transmit the TB having multiple CBs mapped to resources of the TB in a FFPL mapping configuration, wherein the CBGs include a CB transmitted on a first layer and a CB transmitted on a second layer of the multi-layer communication link. The set of instructions, when executed by one or more processors of the transmitting device, may cause the transmitting device to receive HARQ-ACK feedback for the CBGs based at least in part on the grouping of the CBs.

Some aspects described herein relate to an apparatus for wireless communication. The apparatus may include means for receiving, via a multi-layer communication link, an indication of one or more parameters for grouping CBs of a TB into CBGs. The apparatus may include means for receiving the TB having multiple CBs mapped to resources of the TB in a FFPL mapping configuration, wherein the CBGs include a CB received on a first layer and a CB received on a second layer of the multi-layer communication link. The apparatus may include means for transmitting HARQ-ACK feedback for the CBGs based at least in part on the grouping of the CBs.

Some aspects described herein relate to an apparatus for wireless communication. The apparatus may include means for transmitting, via a multi-layer communication link, an indication of one or more parameters for grouping CBs of a TB into CBGs. The apparatus may include means for transmitting the TB having multiple CBs mapped to resources of the TB in a FFPL mapping configuration, wherein the CBGs include a CB transmitted on a first layer and a CB transmitted on a second layer of the multi-layer communication link. The apparatus may include means for receiving HARQ-ACK feedback for the CBGs based at least in part on the grouping of the CBs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
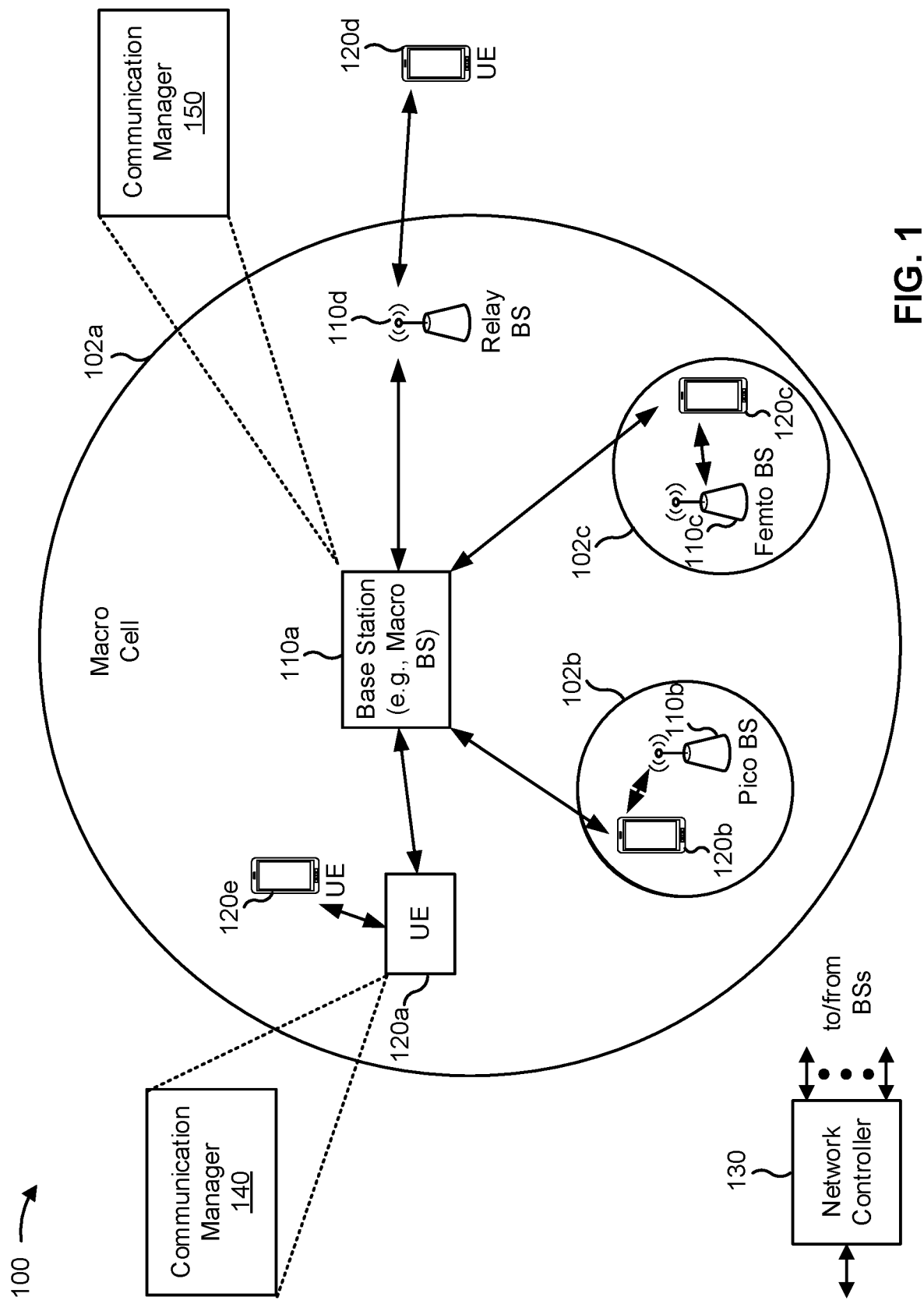
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the receiving device may include a communication manager 140 (e.g., based at least in part on the receiving device being a UE) or 150 (e.g., based at least in part on the receiving device being a base station). As described in more detail elsewhere herein, the communication manager 140 or 150 may receive, via a multi-layer communication link, an indication of one or more parameters for grouping CBs of a TB into CBGs; receive the TB having multiple CBs mapped to resources of the TB in a FFPL mapping configuration, wherein the CBGs include a CB received on a first layer and a CB received on a second layer of the multi-layer communication link; and transmit HARQ-ACK feedback for the CBGs based at least in part on the grouping of the CBs. Additionally, or alternatively, the communication manager 140 or 150 may perform one or more other operations described herein.

In some aspects, the transmitting device may include a communication manager 140 (e.g., based at least in part on the transmitting device being a UE) or 150 (e.g., based at least in part on the transmitting device being a base station). As described in more detail elsewhere herein, the communication manager 140 or 150 may transmit, via a multi-layer communication link, an indication of one or more parameters for grouping CBs of a TB into CBGs; transmit the TB having multiple CBs mapped to resources of the TB in a FFPL mapping configuration, wherein the CBGs include a CB transmitted on a first layer and a CB transmitted on a second layer of the multi-layer communication link; and receive HARQ-ACK feedback for the CBGs based at least in part on the grouping of the CBs. Additionally, or alternatively, the communication manager 140 or 150 may perform one or more other operations described herein.

As indicated above, FIG. 1 is provided as an example. Other examples may differ from what is described with regard to FIG. 1.

Figure 2:
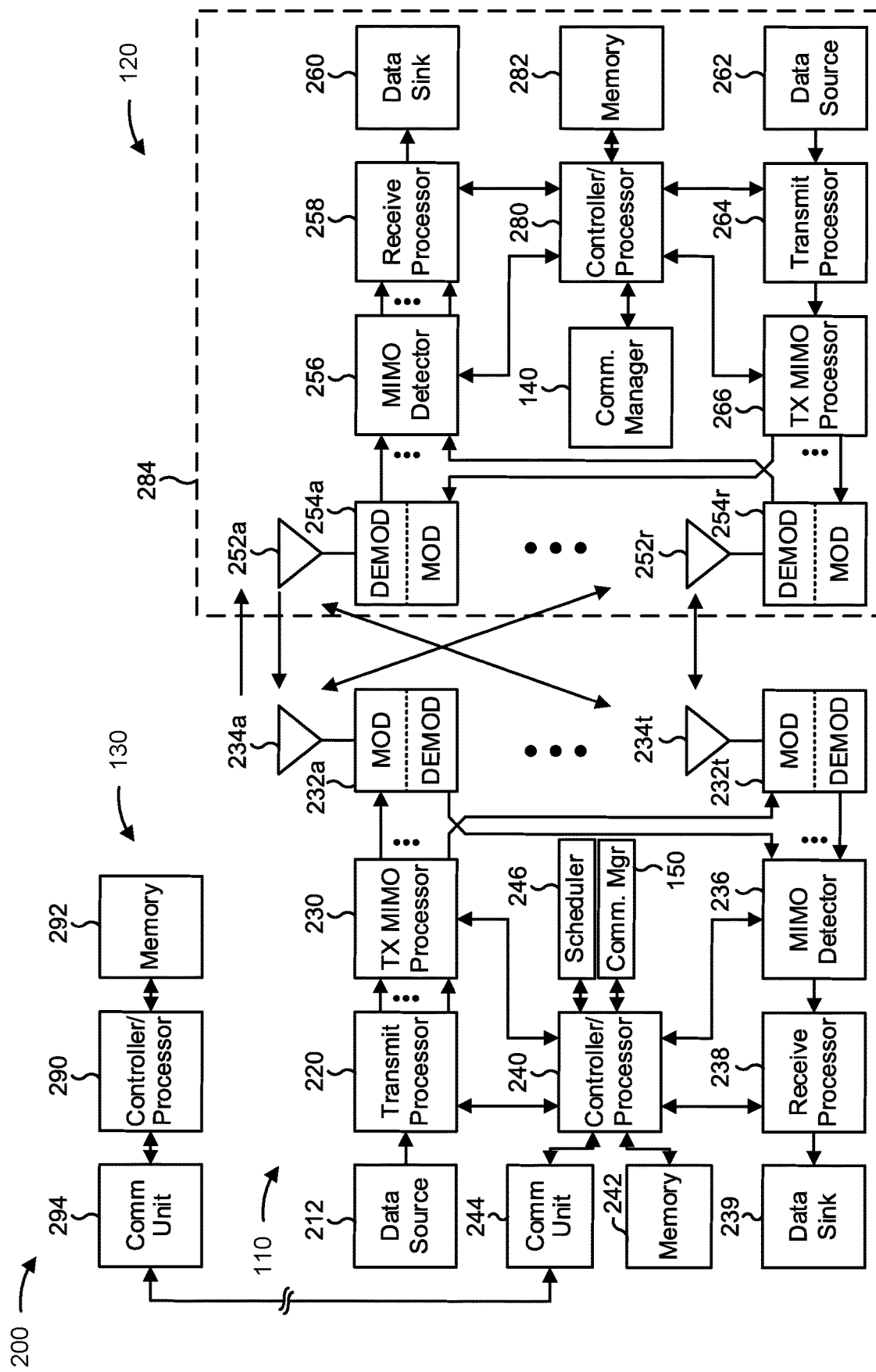
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with CB grouping for FFPL mapping, as described in more detail elsewhere herein. In some aspects, the receiving device described herein is the base station 110, is included in the base station 110, or includes one or more components of the base station 110 shown in FIG. 2. In some aspects, the receiving device described herein is the UE 120, is included in the UE 120, or includes one or more components of the UE 120 shown in FIG. 2. In some aspects, the transmitting device described herein is the base station 110, is included in the base station 110, or includes one or more components of the base station 110 shown in FIG. 2. In some aspects, the transmitting device described herein is the UE 120, is included in the UE 120, or includes one or more components of the UE 120 shown in FIG. 2.

Figure 8:
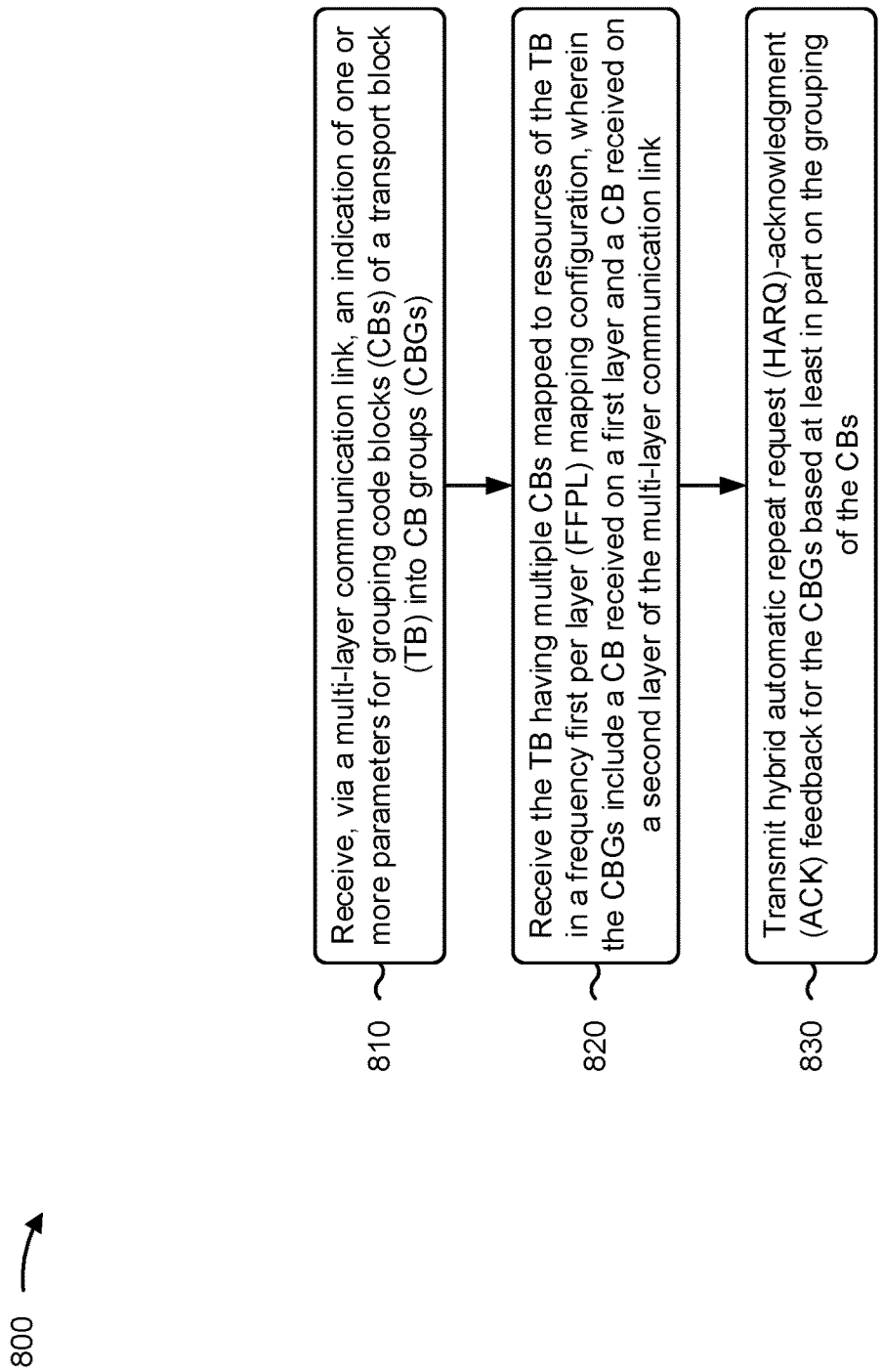
FIGS. 8 and 9 are diagrams illustrating example processes associated with code block grouping for frequency first per layer mapping, in accordance with the present disclosure.
Figure 9:
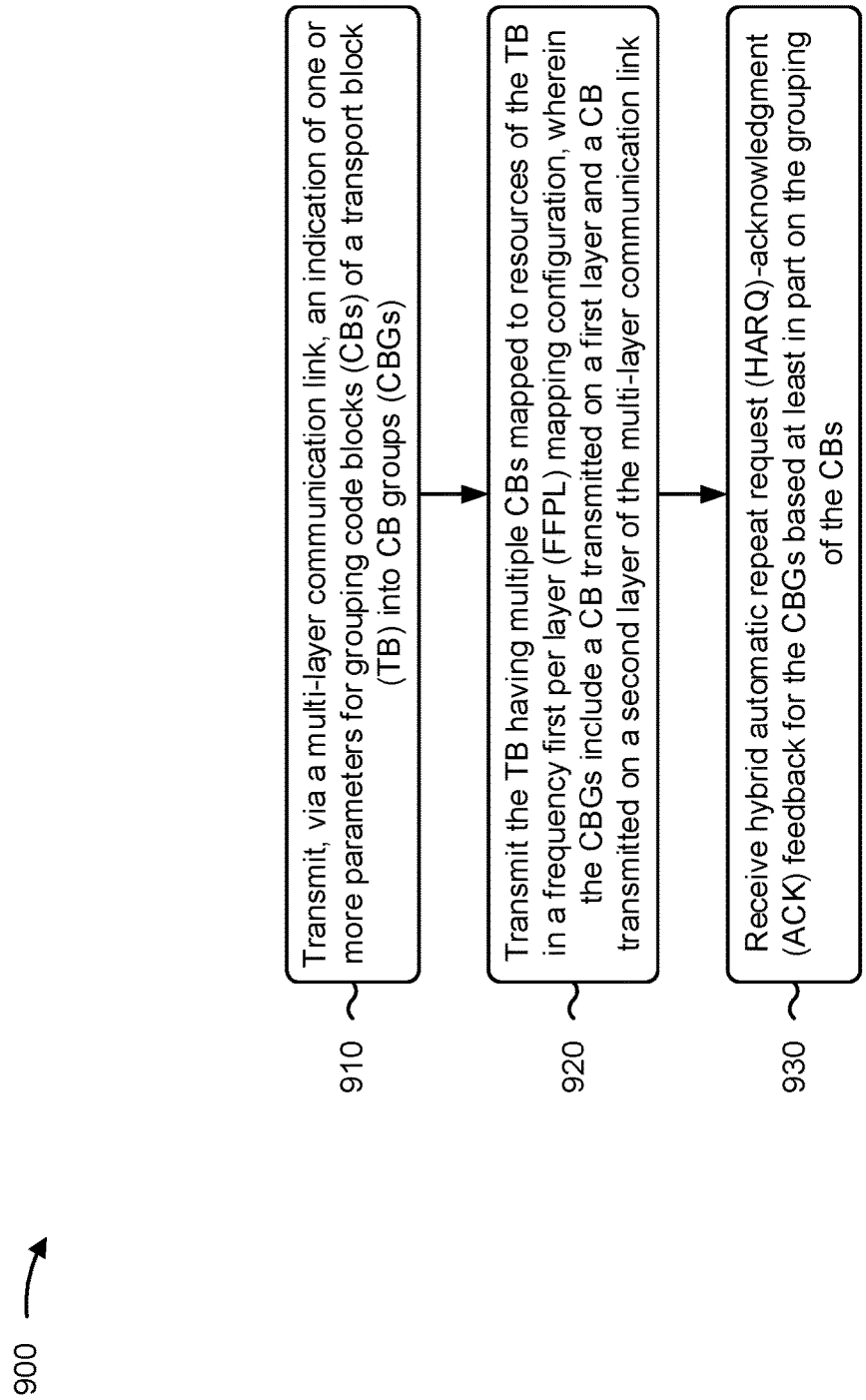

In some aspects, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the receiving device includes means for receiving, via a multi-layer communication link, an indication of one or more parameters for grouping CBs of a TB into CBGs; means for receiving the TB having multiple CBs mapped to resources of the TB in a FFPL mapping configuration, wherein the CBGs include a CB received on a first layer and a CB received on a second layer of the multi-layer communication link; and/or means for transmitting HARQ-ACK feedback for the CBGs based at least in part on the grouping of the CBs. In some aspects, the means for the receiving device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiving device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitting device includes means for transmitting, via a multi-layer communication link, an indication of one or more parameters for grouping CBs of a TB into CBGs; means for transmitting the TB having multiple CBs mapped to resources of the TB in a FFPL mapping configuration, wherein the CBGs include a CB transmitted on a first layer and a CB transmitted on a second layer of the multi-layer communication link; and/or means for receiving HARQ-ACK feedback for the CBGs based at least in part on the grouping of the CBs. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitting device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
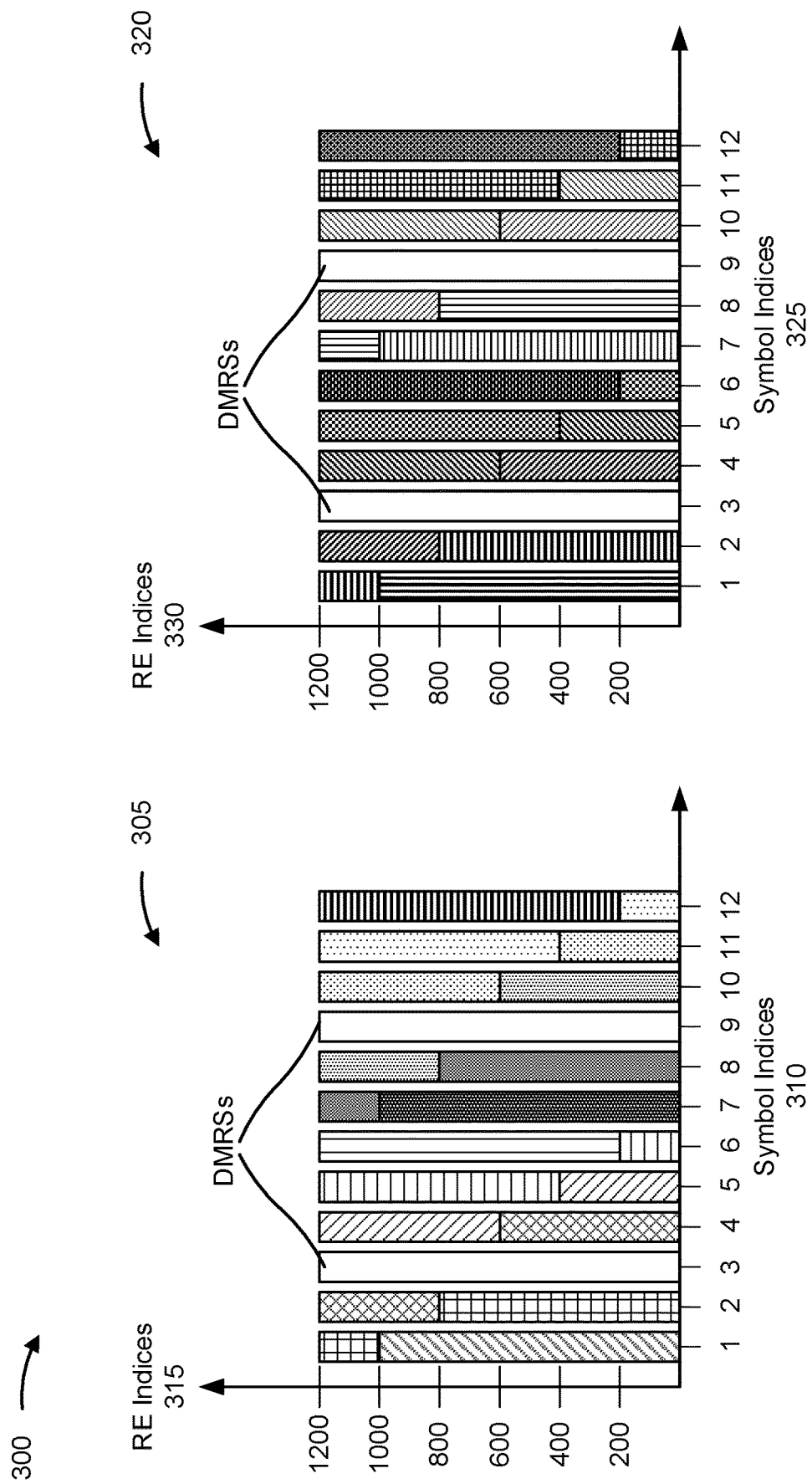
FIG. 3 is a diagram illustrating an example of frequency first per layer mapping, in accordance with the present disclosure.

FIG. 3 is a diagram illustrating an example 300 of FFPL mapping, in accordance with the present disclosure. A transmitting device (e.g., a base station or a UE) may transmit a TB to a receiving device (e.g., a UE or a base station) with the TB including multiple CBs. The transmitting device may transmit, and the receiving device may receive, the TB using multiple layers (e.g., in different streams using an overlapping set, or a same set, of time-frequency resources).

As shown in FIG. 3, the TB includes a first set 305 of CBs transmitted via a first layer of the TB. The first set 305 of CBs include a lowest index CB that is mapped to earliest available time resources (e.g., an earliest symbol) until the lowest index CB is fully assigned to resources (e.g., resources elements (REs)) of the earliest available time resources. A next-lowest index CB is mapped to earliest available time resources (e.g., possibly a same time resource that includes a part of the lowest index CB) that are available after mapping of the lowest index CB. In this way, CBs of the first set 305 of CBs are mapped with a time order that is based at least in part on indices of the CBs.

As shown by example 300, a first CB is mapped to REs of a first symbol of symbol indices 310. The first CB of the first set 305 is mapped to RE indices 0-1000 of RE indices 315. A second CB of the first set 305 is mapped to REs with RE indices 1000-1200 of the first symbol and REs with RE indices 0-800 of a second symbol. A third CB of the first set 305 is mapped to REs with RE indices 800-1200 of the second symbol and REs with RE indices 0-600 of a fourth symbol. As shown, one or more DMRS symbols may be mapped to one or more symbol indices and the CBs may not be mapped to the one or more DMRS symbols (e.g., may skip over the DMRS symbols for mapping to the symbols indices 310). A fourth CB of the first set 305 is mapped to REs with RE indices 600-1200 of the fourth symbol and REs with RE indices 0-400 of a fifth symbol. Remaining CBs of the first set 305 may be mapped to REs of the first layer in a similar manner.

As shown in FIG. 3, the TB includes a second set 320 of CBs transmitted via a second layer of the TB. The second set 320 of CBs include a lowest index CB that is mapped to earliest available time resources (e.g., an earliest symbol) until the lowest index CB is fully assigned to resources (e.g., REs) of the earliest available time resources. A next-lowest index CB is mapped to earliest available time resources (e.g., possibly a same time resource that includes a part of the lowest index CB) that are available after mapping of the lowest index CB. In this way, CBs of the second set 320 of CBs are mapped with a time order that is based at least in part on indices of the CBs.

As shown by number example 300, a first CB of the second set 320 is mapped to REs of a first symbol of symbol indices 325. The first CB of second set 320 is mapped to RE indices 0-1000 of RE indices 330. A second CB of the second set 320 is mapped to REs with RE indices 1000-1200 of the first symbol and REs with RE indices 0-800 of a second symbol. A third CB of the second set 320 is mapped to REs with RE indices 800-1200 of the second symbol and REs with RE indices 0-600 of a fourth symbol. As shown, one or more DMRS symbols may be mapped to one or more symbol indices and the CBs may not be mapped to the one or more DMRS symbols (e.g., may skip over the DMRS symbols for mapping to the symbols indices 325). A fourth CB of the second set 320 is mapped to REs with RE indices 600-1200 of the fourth symbol and REs with RE indices 0-400 of a fifth symbol. Remaining CBs of the second set 320 may be mapped to REs of the second layer in a similar manner.

In an FFPL mapping configuration, CBs of the TB may be mapped to the layers of the TB in an alternating pattern. For example, an indexed order of the CBs may be mapped to the layers of the TB as {first CB of the first layer, first CB of the second layer, second CB of the first layer, second CB of the second layer, third CB of the first layer, third CB of the second layer . . . nth CB of the first layer, nth CB of the second layer}.

FFPL mapping may enhance frequency diversity, which may improve decoding and/or demodulation for communication links having relatively low channel coherency and/or having a relatively high delay spread. FFPL may be used for communication links having relatively high spectral efficiency (e.g., with a relatively high MCS and multiple communication layers). In these communication links, frequency diversity may improve demodulation and/or decoding more than layer diversity. FFPL mapping may support a receiving device using successive interference cancellation (SIC) de-mapping operations with algorithms such as minimum mean squared error (MMSE)-SIC. In this way, the receiving device may decode the TB in a layer-by-layer operation in which decoding of a first layer may be used to improve decoding of a second layer.

As indicated above, FIG. 3 is provided as an example. Other examples may differ from what is described with regard to FIG. 3.

In some networks, code block groups (CBGs) may be used to improve HARQ-ACK feedback for a TB. For example, when HARQ-ACK reporting and associated HARQ retransmissions are defined per TB, when a single CB of the TB fails, the entire TB may need to be re-transmitted. With communication links that have a relatively high spectral efficiency, a TB may include a relatively high number of CBs. With a relatively high number of CBs included in the TB, a probability increases that at least one CB will fail and a retransmission for the entire TB will be required.

Grouping of multiple consecutive CBs of a TB into a non-overlapping groups of CBGs may be used to report HARQ-ACK feedback for individual CBGs instead of using a single indication of HARQ-ACK feedback for the entire TB. For example, HARQ-ACK feedback signaling of the TB may include multiple bits, each for a different CBG of the TB. HARQ retransmissions may be transmitted per CBG corresponding to the HARQ-ACK feedback of the CBG. Efficiency gains of using CBGs may be based at least in part on channel characteristics, signal-to-noise-ratio (SNR) conditions and/or impairments, and based at least in part on an allocation associated with the TB.

A transmitting device (e.g., a base station or a UE) and a receiving device (e.g., a UE or a base station) may use a defined rule for grouping CBs into CBGs. For example, if the receiving device is configured to receive CBG-based transmissions (e.g., by receiving a higher layer parameter codeBlockGroupTransmission, for example, for a physical downlink shared channel (PDSCH)), the receiving device may determine a number of CBGs for the TB reception as M min(N,C), where M is a number of CBGs of the TB, N is a maximum number of CBGs per TB as configured by, for example, maxCodeBlockGroupsPerTransportBlock for PDSCH, and C is a number of CBs in the TB. Define $$M_1 = \mathrm{mod}(C, M), K_1 = \left\lceil \frac{C}{M} \right\rceil, K_2 = \left\lfloor \frac{C}{M} \right\rfloor.$$

If $M_1 > 0$, CBG m, m=0,1, . . . , $M_1-1$, consists of code block with indices $m \cdot K_1 + k$, k=0,1, . . . , $K_1-1$. CBG m, m=$M_1$, $M_1+1$, . . . , M-1, consists of code block with indices $M_1 \cdot K_1 + (m-M_1) \cdot K_2 + k$, k=0,1, . . . , $K_2-1$.

However, using the above rule for determining the number of CBGs for the TB, the TB may include a CBG that includes CBs on fewer than all layers of the TB. In this way, the HARQ-ACK feedback for a CBG may not support FFPL mapping and/or advantages of FFPL mapping such as SIC and/or MMSE-SIC to improve decoding of the CBs on multiple layers of the TB.

In some aspects described herein, a receiving device and/or a transmitting device (e.g., in uplink, downlink, and/or sidelink communications) may communicate using FFPL mapping of CBs to a TB, with the CBs mapped to CBGs having CBs that span a subset of time-frequency resources that are shared by all layers of the TB. In this way, the receiving device and the transmitting device may improve link efficiency (e.g., based at least in part on improved decoding of the CBs on multiple layers), improved reliability and reduced re-transmissions, and/or may support advantageous decoding operations associated with FFPL mapping (e.g., MMSE-SIC demodulation).

In some aspects, a UE is configured to receive CBG-based transmissions by receiving, for example, the higher layer parameter codeBlockGroupTransmission for PDSCH. The UE shall determine the number of CBGs (M) for a transport block reception as:

$$M = \min\left(N, \frac{C}{P}\right)$$

where N is a maximum number of CBGs per transport block as configured by, for example, maxCodeBlockGroupsPer-TransportBlock for PDSCH, C is the number of code blocks in the transport block according to a CBs segmentation procedure (for FFPL CBs mapping option), and P is a number of layers of the TB.

The UE and the base station may determine the CBG based at least in part on defining $$M_1 = \mathrm{mod}\left(\frac{C}{P}, M\right), K_1 = P \cdot \left\lceil \frac{\frac{C}{P}}{M} \right\rceil, K_2 = P \cdot \left\lfloor \frac{\frac{C}{P}}{M} \right\rfloor.$$

If $M_1 > 0$, CBG m, m=0,1, . . . , $M_1-1$, consists of code block with indices $m \cdot K_1 + k$, k=0,1, . . . , $K_1-1$. CBG m, m=$M_1$, $M_1+1$, . . . , M-1, consists of code block with indices $M_1 \cdot K_1 + (m-M_1) \cdot K_2 + k$, k=0,1, . . . , $K_2-1$.

Using this definition differences from the current procedure for grouping of code blocks into code block groups by taking the number of layers of the TB into account in order to cause each CBG to correspond to a subset of CBs (each associated with a single layer) and corresponding resources (e.g., REs) while the CBGs (e.g., all CBGs) are represented by a complete set of layers.

As can be seen from the above definitions $$\left[\frac{C}{\frac{P}{M}}\right] \text{ and } \left\lfloor\frac{C}{\frac{P}{M}}\right\rfloor$$

defines how many CBs per layer we have in each CBG. As a result, a difference in a number of CBs per CBG may vary with ±P CBs between CBGs instead of ±1 CB difference between CBGs as previously defined.

Figure 4:
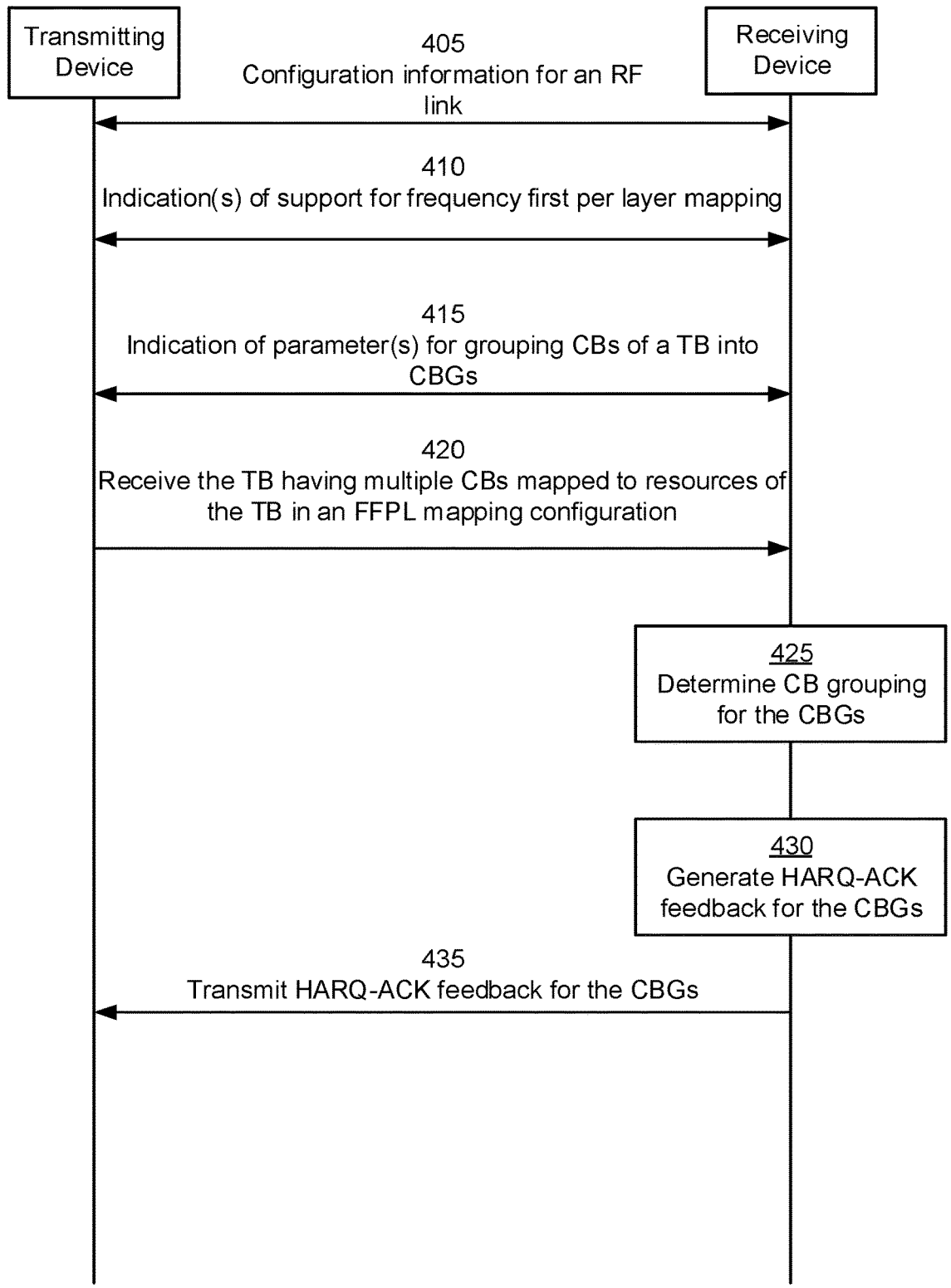
FIGS. 4-7 are diagrams illustrating examples associated with code block grouping for frequency first per layer mapping, in accordance with the present disclosure.

FIG. 4 is a diagram illustrating an example 400 associated with CB grouping for FFPL mapping, in accordance with the present disclosure. As shown in FIG. 4, a transmitting device (e.g., base station 110, a network node (e.g., an Integrated access and backhaul (IAB) node) or UE 120) may communicate with a receiving device (e.g., UE 120, a network node (e.g., an IAB node) or base station 110). In some aspects, the transmitting device and the receiving device may be part of a wireless network (e.g., wireless network 100). The transmitting device and the receiving device may have established a wireless connection prior to operations shown in FIG. 4. In some aspects, a communication link between the transmitting device and the receiving device may have conditions that support high spectral efficiency communications, such as multi-layer communications and/or relatively high MCS communications, among other examples. In some aspects, the communication link may include a multi-layer communication link.

As shown by reference number 405, the transmitting device and the receiving device may communicate configuration information. In some aspects (e.g., where the transmitting device is a base station), the transmitting device may transmit the configuration information. In some aspects (e.g., where the transmitting device is a UE), the transmitting device may receive the configuration information. In some aspects, the transmitting device and the receiving device may communicate the configuration information via one or more of radio resource control (RRC) signaling, one or more medium access control (MAC) control elements (CEs) (MAC-CEs), and/or downlink control information (DCI), among other examples. In some aspects, the configuration information may include an indication of one or more configuration parameters (e.g., already known to the receiving device and/or the transmitting device) for selection by the receiving device and/or the transmitting device, or explicit configuration information for the receiving device and/or the transmitting device to use to configure the receiving device and/or the transmitting device, among other examples.

In some aspects, the configuration information may indicate that the receiving device and/or the transmitting device is to use FFPL mapping of CBs to a TB. In some aspects, the configuration information may indicate that the receiving device and/or the transmitting device are to use CB grouping that defines CBGs to include CBs on multiple layers (e.g., all layers) of the TB.

The receiving device and/or the transmitting device may configure themselves based at least in part on the configuration information. In some aspects, the receiving device and/or the transmitting device may be configured to perform one or more operations described herein based at least in part on the configuration information.

As shown by reference number 410, the receiving device and the transmitting device may communicate support for FFPL mapping (e.g., in a capabilities report). In some aspects, the receiving device and the transmitting device may communicate the support for FFPL mapping via a capabilities report.

In some aspects, the receiving device may transmit, and the transmitting device may receive, an indication of receiving device support for receiving the TB having the multiple CBs mapped to resources of the TB in an FFPL mapping configuration, with the CBGs including at least one CB on a first layer and at least one CB on a second layer of the multi-layer communication link (e.g., with each CBG including at least one CB on each layer of the multi-layer communication link). Additionally, or alternatively, the transmitting device may transmit, and the receiving device may receive, an indication of transmitting device support for transmitting the TB having the multiple CBs mapped to resources of the TB in an FFPL mapping configuration, with the CBGs including at least one CB on a first layer and at least one CB on a second layer of the multi-layer communication link (e.g., with each CBG including at least one CB on each layer of the multi-layer communication link).

In some aspects, the receiving device may transmit, and the transmitting device may receive, an indication that the TB is to have the multiple CBs mapped to resources of the TB in an FFPL mapping configuration, with the CBGs including at least one CB on a first layer and at least one CB on a second layer of the multi-layer communication link (e.g., with each CBG including at least one CB on each layer of the multi-layer communication link). In some aspects, the transmitting device may transmit, and the receiving device may receive, an indication that the TB is to have multiple CBs mapped to resources of the TB in an FFPL mapping configuration, with the CBGs including at least one CB on a first layer and at least one CB on a second layer of the multi-layer communication link (e.g., with each CBG including at least one CB on each layer of the multi-layer communication link).

As shown by reference number 415, the receiving device and/or the transmitting device may communicate an indication of one or more parameters for grouping CBs of a TB into CBGs. For example, the indication of the one or more parameters may include an indication of a maximum number of CBGs for the TB, an indication of a number of spatial layers of the TB, and/or an indication of a number of CBs for the TB, among other examples. In some aspects, the one or more parameters may be applied to multiple TBs. For example, the one or more parameters may be indicated in RRC signaling and/or in a semi-persistent scheduling grant, among other examples.

As shown by reference number 420, the receiving device may receive, and the transmitting device may transmit, the TB having multiple CBs mapped to resources of the TB in an FFPL mapping configuration. In some aspects, the CBs are mapped to CBGs that include a CB received on a first layer and a CB received on a second layer of the multi-layer communication link. For example, each CBG may include at least one CB mapped to a first layer and at least one CB that is mapped to a second layer. The CBGs may include mutually exclusive groups of the CBs.

In some aspects, CBs received on the first layer are received on only the first layer and CBs received on the second layer are received on only the second layer. In some aspects, CBs of a CBG include consecutive CBs of the TB (e.g., based at least in part on CB indices). In this way, the consecutive CBs of the TB are mapped to different layers of the TB.

In some aspects, the CBs of a CBG may occupy a same set of resources on different layers. For example, a first CB of the CBG may occupy a first set of time-frequency resources on a first layer, a second CB may occupy the first set of time-frequency resources on second layer, and/or a third CB may occupy the first set of time-frequency resources on a third layer. Additionally, or alternatively, a fourth CB of the CBG may occupy a second set of time-frequency resources on a first layer, a fifth CB may occupy the second set of time-frequency resources on second layer, and/or a sixth CB may occupy the second set of time-frequency resources on a third layer.

In some aspects, each CBG of CBGs includes at least one CB in each layer of the TB. In some aspects, a first CBG may include number of CBs that is different from a number of CBs included in a second CBG. This may support individual CBGs having a same number of CBs in each layer, even if different CBGs have different numbers of CBs in the layers. In some aspects, each of the CBGs include either a first number of CBs or a second number of CBs. For example, CBGs of a subset of the CBGs include a higher number of CBs and CBGs of a second subset of the CBGs include a lower number of CBs.

As shown by reference number 425, the receiving device may determine CB grouping for the CBGs. In some aspects, the receiving device may determine the number of CBGs for the TB using the one or more parameters described in connection with reference number 415. For example, the number of CBGs for the TB may be based at least in part on a minimum value of a set that includes a maximum number of CBGs for the TB, and a quotient of a number of the CBs of the TB and a number of spatial layers of the TB.

In some aspects, the transmitting device may determine map the CBs to the TB and to CBGs before transmitting the TB. In this way, the transmitting device may be synchronized with the receiving device in mapping the CBs to CBGs for HARQ-ACK feedback.

As shown by reference number 430, the receiving device may generate HARQ-ACK feedback for the CBGs. For example, the receiving device may determine whether any of the CBs failed to be received. The receiving device may then determine which, if any, of the CBGs include CBs that failed to be received. The UE may then generate the HARQ-ACK feedback to indicate the CBGs that were received and/or the CBGs that failed to be received.

As shown by reference number 435, the receiving device may transmit, and the transmitting device may receive, the HARQ-ACK feedback for the CBGs. In some aspects, the receiving device may transmit the HARQ-ACK feedback for the CBGs with a code point-based and/or a bitmap-based indication of the CBGs that were received and/or the CBGs that failed to be received. In some aspects, the transmitting device may transmit a subsequent TB that includes only the CBGs indicated as having been failed to be received.

Based at least in part on the CBGs including CBs that span across multiple layers (e.g., all layers) of the TB, the receiving device and the transmitting device may improve link efficiency (e.g., based at least in part on improved decoding of the CBs on multiple layers), improved reliability and reduced re-transmissions, and/or may support advantageous decoding operations associated with FFPL mapping (e.g., MMSE-SIC demodulation).

As indicated above, FIG. 4 is provided as an example. Other examples may differ from what is described with regard to FIG. 4.

Figure 5:
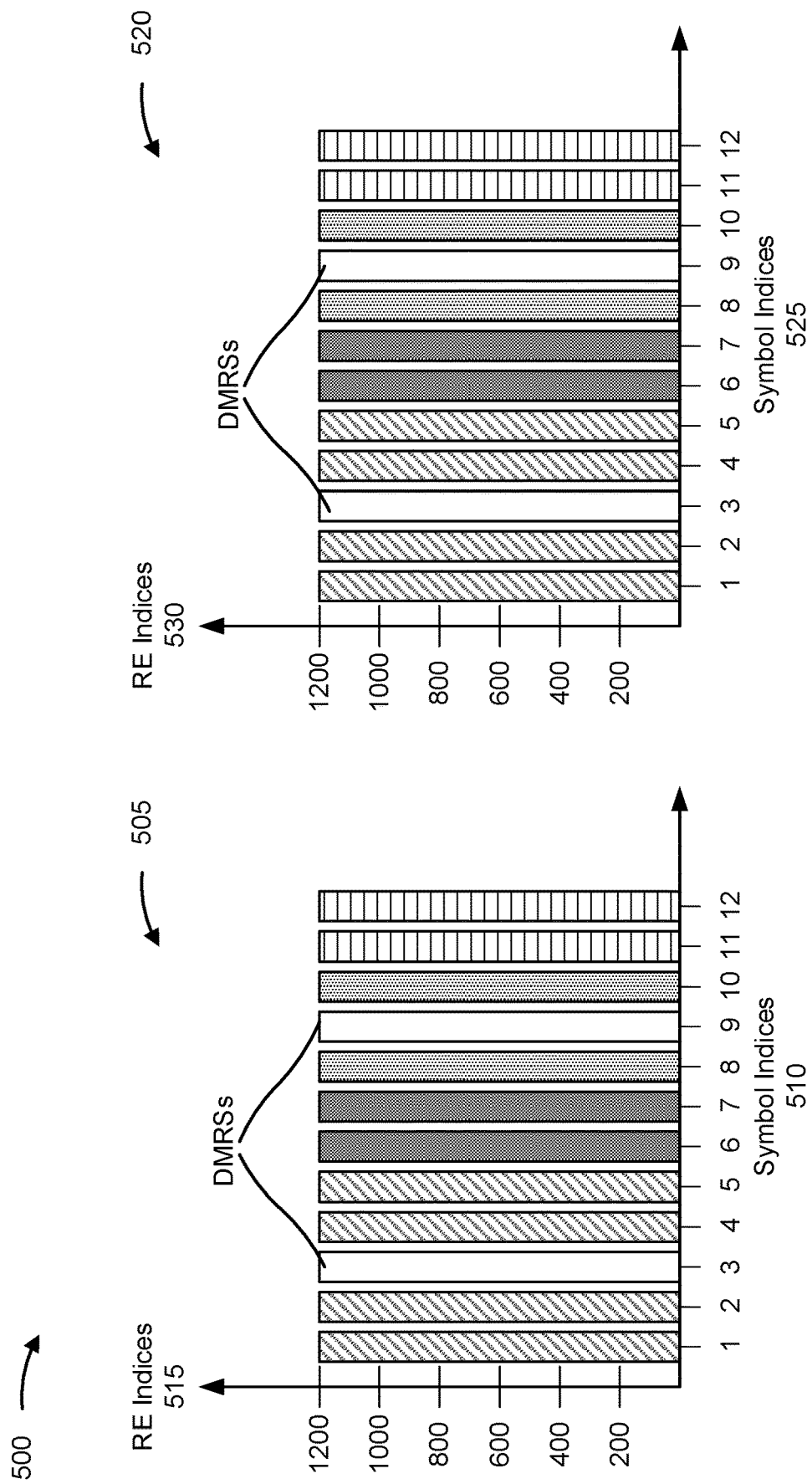

FIG. 5 is a diagram illustrating an example 500 associated with CB grouping for FFPL mapping, in accordance with the present disclosure. As shown in FIG. 5, a transmitting device (e.g., base station 110, a network node (e.g., an IAB node) or UE 120) may communicate with a receiving device (e.g., UE 120, a network node (e.g., an IAB node) or base station 110). In some aspects, the transmitting device and the receiving device may be part of a wireless network (e.g., wireless network 100). The transmitting device and the receiving device may have established a wireless connection prior to operations shown in FIG. 5. In some aspects, a communication link between the transmitting device and the receiving device may have conditions that support high spectral efficiency communications, such as multi-layer communications and/or relatively high MCS communications, among other examples. In some aspects, the communication link may include a two-layer communication link, a number of CBs is 10, and a maximum number of CBGs is 4.

As shown in FIG. 5, a TB includes a first set 505 of CBs transmitted via a first layer of the TB in a FFPL configuration (e.g., as shown in FIG. 3). As shown in example 500, a first CBG may include a set of resources that span both layers of the communication link. For example, the first CBG includes at least one CBG (e.g., 2 CBGs) that map to a first symbol, a second symbol, a fourth symbol, and a fifth symbol of symbol indices 510 and maps to RE indices 0-1200 of the RE indices 515. The first CBG also includes at least one CBG (e.g., 2 CBGs) in a second layer of a second set 520 of CBs that maps to a first symbol, a second symbol, a fourth symbol, and a fifth symbol of symbol indices 525 and map to RE indices 0-1200 of the RE indices 530. A second CBG includes at least one CBG (e.g., 1 CBG) that maps to a sixth symbol and a seventh symbol and maps to RE indices 0-1200 in both of the first set 505 and the second set 520 (e.g., in both layers of the TB). A third CBG includes at least one CBG (e.g., 1 CBG) that maps to an eighth symbol and a tenth symbol and maps to RE indices 0-1200 in both of the first set 505 and the second set 520 (e.g., in both layers of the TB). A fourth CBG includes at least one CBG (e.g., 1 CBG) that maps to an eleventh symbol and a twelfth symbol and maps to RE indices 0-1200 in both of the first set 505 and the second set 520 (e.g., in both layers of the TB).

As indicated above, FIG. 5 is provided as an example. Other examples may differ from what is described with regard to FIG. 5.

Figure 6:
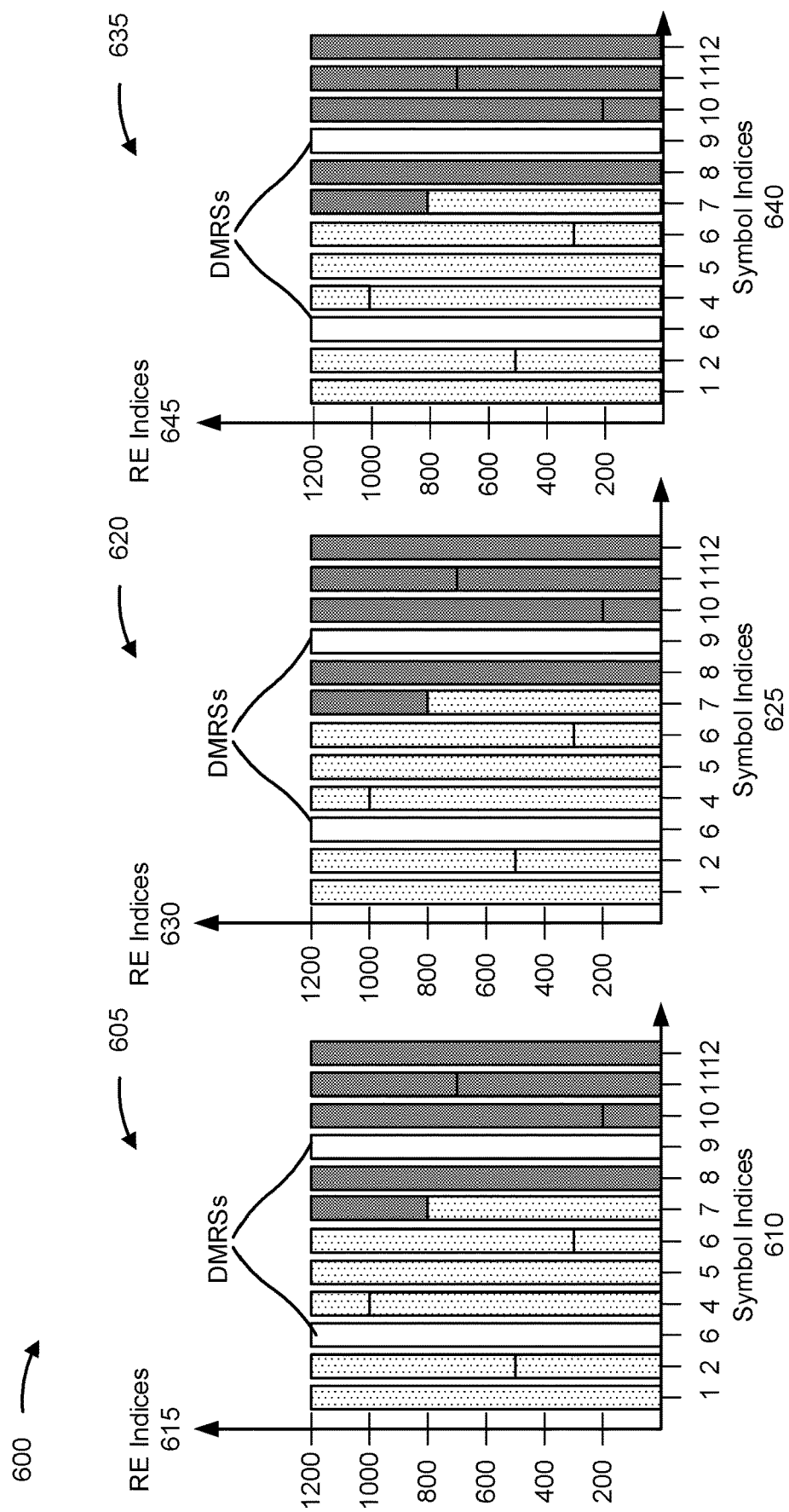

FIG. 6 is a diagram illustrating an example 600 associated with CB grouping for FFPL mapping, in accordance with the present disclosure. As shown in FIG. 6, a transmitting device (e.g., base station 110, a network node (e.g., an IAB node) or UE 120) may communicate with a receiving device (e.g., UE 120, a network node (e.g., an IAB node) or base station 110). In some aspects, the transmitting device and the receiving device may be part of a wireless network (e.g., wireless network 100). The transmitting device and the receiving device may have established a wireless connection prior to operations shown in FIG. 6. In some aspects, a communication link between the transmitting device and the receiving device may have conditions that support high spectral efficiency communications, such as multi-layer communications and/or relatively high MCS communications, among other examples. In some aspects, the communication link may include a three-layer communication link, a number of CBs is 21, and a maximum number of CBGs is 2.

As shown in FIG. 6, a TB includes a first set 605 of CBs transmitted via a first layer of the TB in a FFPL configuration (e.g., as shown in FIG. 3). As shown in example 600, a first CBG may include a set of resources that span each layer of the communication link. For example, the first CBG includes at least one CBG (e.g., 4 CBGs) that maps to a first symbol, a second symbol, a fourth symbol, a fifth symbol, a sixth symbol and a subset of resources of a seventh symbol of symbol indices 610 and maps to RE indices 0-1200 of the RE indices 615 for the first through sixth symbols and to RE indices 0-800 for the seventh symbol. The first CBG also includes at least one CBG (e.g., 3 CBGs) in a second layer of a second set 620 of CBs that maps to a first symbol, a second symbol, a fourth symbol, a fifth symbol, a sixth symbol and a subset of resources of a seventh symbol of symbol indices 625 and maps to RE indices 0-1200 of the RE indices 630 for the first through sixth symbols and to RE indices 0-800 for the seventh symbol. The first CBG also includes at least one CBG (e.g., 4 CBGs) in a third layer of a third set 635 of CBs that maps to a first symbol, a second symbol, a fourth symbol, a fifth symbol, a sixth symbol and a subset of resources of a seventh symbol of symbol indices 640 and maps to RE indices 0-1200 of the RE indices 645 for the first through sixth symbols and to RE indices 0-800 for the seventh symbol. A second CBG includes at least one CBG (e.g., 3 CBG) that maps to a different subset of resources of the seventh symbol, an eighth symbol, a tenth symbol, an eleventh symbol and a twelfth symbol and maps to RE indices 0-1200 for the eighth through twelfth symbol and to RE indices 800-1200 for the seventh symbol in each of the first set 505, the second set 520, and the third set 635 (e.g., in all layers of the TB).

As indicated above, FIG. 6 is provided as an example. Other examples may differ from what is described with regard to FIG. 6.

Figure 7:
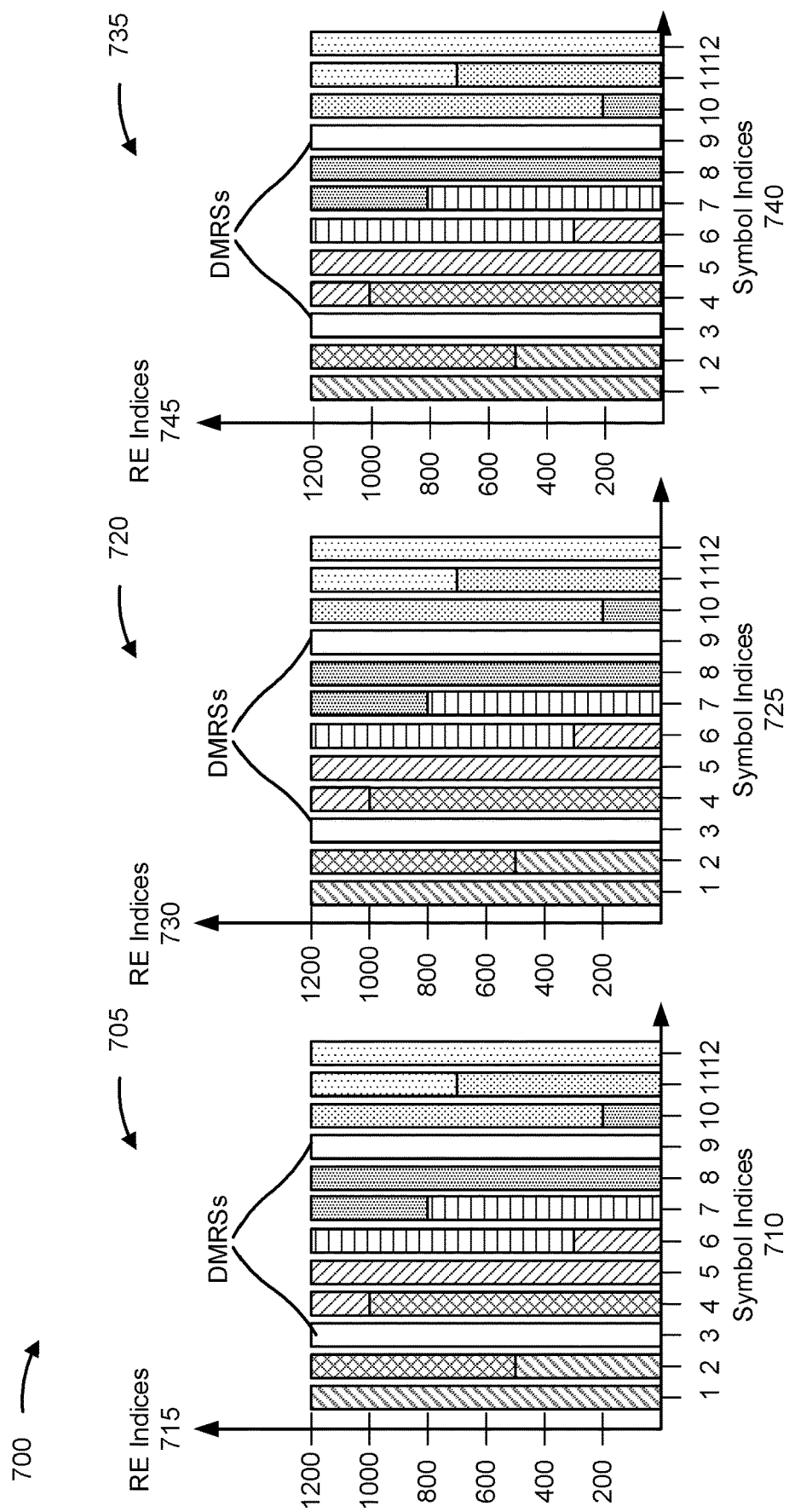

FIG. 7 is a diagram illustrating an example 700 associated with CB grouping for FFPL mapping, in accordance with the present disclosure. As shown in FIG. 7, a transmitting device (e.g., base station 110, a network node (e.g., an IAB node) or UE 120) may communicate with a receiving device (e.g., UE 120, a network node (e.g., an IAB node) or base station 110). In some aspects, the transmitting device and the receiving device may be part of a wireless network (e.g., wireless network 100). The transmitting device and the receiving device may have established a wireless connection prior to operations shown in FIG. 7. In some aspects, a communication link between the transmitting device and the receiving device may have conditions that support high spectral efficiency communications, such as multi-layer communications and/or relatively high MCS communications, among other examples. In some aspects, the communication link may include a three-layer communication link, a number of CBs is 21, and a maximum number of CBGs is 8.

As shown in FIG. 7, a TB includes a first set 705 of CBs transmitted via a first layer of the TB in a FFPL configuration (e.g., as shown in FIG. 3). As shown in example 700, a first CBG may include a set of resources that span each layer of the communication link. For example, the first CBG includes at least one CBG (e.g., 1 CBG) that maps to a first symbol and a subset of resources of a second symbol of symbol indices 710 and maps to RE indices 0-1200 of the RE indices 715 for the first symbol and to RE indices 0-600 for the second symbol. The first CBG also includes at least one CBG (e.g., 1 CBG) in a second layer of a second set 720 of CBs that map to a first symbol and a subset of resources of a second symbol of symbol indices 725 and maps to RE indices 0-1200 of the RE indices 730 for the first symbol and to RE indices 0-600 for the second symbol. The first CBG also includes at least one CBG (e.g., 1 CBG) in a third layer of a third set 735 of CBs that maps to a first symbol and a subset of resources of a second symbol of symbol indices 740 and maps to RE indices 0-600 of the RE indices 745. A second CBG includes at least one CBG (e.g., 1 CBG) that maps to a different subset of resources of the second symbol and to a subset of a fourth symbol and maps to RE indices 600-1200 for the second symbol and to RE indices 0-1000 for the fourth symbol in each of the first set 705, the second set 720, and the third set 735 (e.g., in all layers of the TB). A third CBG includes at least one CBG (e.g., 1 CBG) that maps to a different subset of resources of the fourth symbol, to a fifth symbol, and to a subset of resource of a sixth symbol and maps to RE indices 1000-1200 for the third symbol, RE indices 0-1200 for the fifth symbol, and to RE indices 0-300 for the sixth symbol in each of the first set 705, the second set 720, and the third set 735 (e.g., in all layers of the TB). A fourth CBG includes at least one CBG (e.g., 1 CBG) that maps to a different subset of resources of the sixth symbol and to a seventh symbol and maps to RE indices 300-1200 for the sixth symbol and to RE indices 0-800 for the seventh symbol in each of the first set 705, the second set 720, and the third set 735 (e.g., in all layers of the TB). A fifth CBG includes at least one CBG (e.g., 1 CBG) that maps to a different subset of resources of the seventh symbol, an eight symbol, and a subset of resources of a tenth symbol and maps to RE indices 800-1200 for the seventh symbol, to RE indices 0-1200 for the eighth symbol, and to RE indices 0-200 for the tenth symbol in each of the first set 705, the second set 720, and the third set 735 (e.g., in all layers of the TB). A sixth CBG includes at least one CBG (e.g., 1 CBG) that maps to a different subset of resources of the tenth symbol and to a subset of resources of an eleventh symbol and maps to RE indices 300-1200 for the tenth symbol and to RE indices 0-700 for the eleventh symbol in each of the first set 705, the second set 720, and the third set 735 (e.g., in all layers of the TB). A seventh CBG includes at least one CBG (e.g., 1 CBG) that maps to a different subset of resources of the eleventh symbol and to a twelfth symbol and maps to RE indices 700-1200 for the eleventh symbol and to RE indices 0-1200 for the twelfth symbol in each of the first set 705, the second set 720, and the third set 735 (e.g., in all layers of the TB).

As indicated above, FIG. 7 is provided as an example. Other examples may differ from what is described with regard to FIG. 7.

FIG. 8 is a diagram illustrating an example process 800 performed, for example, by a receiving device, in accordance with the present disclosure. Example process 800 is an example where the receiving device (e.g., base station 110 or UE 120) performs operations associated with code block grouping for frequency first per layer mapping.

As shown in FIG. 8, in some aspects, process 800 may include receiving, via a multi-layer communication link, an indication of one or more parameters for grouping CBs of a TB into CBGs (block 810). For example, the receiving device (e.g., using communication manager 140 or 150 and/or reception component 1002, depicted in FIG. 10) may receive, via a multi-layer communication link, an indication of one or more parameters for grouping CBs of a TB into CBGs, as described above.

As further shown in FIG. 8, in some aspects, process 800 may include receiving the TB having multiple CBs mapped to resources of the TB in a FFPL mapping configuration, wherein the CBGs include a CB received on a first layer and a CB received on a second layer of the multi-layer communication link (block 820). For example, the receiving device (e.g., using communication manager 140 or 150 and/or reception component 1002, depicted in FIG. 10) may receive the TB having multiple CBs mapped to resources of the TB in a FFPL mapping configuration, wherein the CBGs include a CB received on a first layer and a CB received on a second layer of the multi-layer communication link, as described above.

As further shown in FIG. 8, in some aspects, process 800 may include transmitting HARQ-ACK feedback for the CBGs based at least in part on the grouping of the CBs (block 830). For example, the receiving device (e.g., using communication manager 140 or 150 and/or transmission component 1004, depicted in FIG. 10) may transmit HARQ-ACK feedback for the CBGs based at least in part on the grouping of the CBs, as described above.

Process 800 may include additional aspects, such as any single aspect or any combination of aspects described below and/or in connection with one or more other processes described elsewhere herein.

In a first aspect, the CB received on the first layer is received on only the first layer, and wherein the CB received on the second layer is received on only the second layer.

In a second aspect, alone or in combination with the first aspect, the CB received on the first layer and the CB received on the second layer are consecutive CBs of the TB.

In a third aspect, alone or in combination with one or more of the first and second aspects, the CB received on the first layer and the CB received on the second layer are mapped to a same set of resource elements.

In a fourth aspect, alone or in combination with one or more of the first through third aspects, the receiving device comprises a UE, a base station, or a network node.

In a fifth aspect, alone or in combination with one or more of the first through fourth aspects, the indication of the one or more parameters for grouping CBs of the TB into CBGs comprises an indication of a maximum number of CBGs for the TB, an indication of a number of spatial layers of the TB, or an indication of a number of CBs for the TB.

In a sixth aspect, alone or in combination with one or more of the first through fifth aspects, a number of the CBGs is based at least in part on a minimum value of a set that includes a maximum number of CBGs for the TB, and a quotient of a number of the CBs of the TB and a number of spatial layers of the TB.

In a seventh aspect, alone or in combination with one or more of the first through sixth aspects, a first CBG includes a first number of CBs and a second CBG includes a second number of CBs, wherein the first number is different from the second number.

In an eighth aspect, alone or in combination with one or more of the first through seventh aspects, each CBG of CBGs includes at least one CB in each layer of the TB.

In a ninth aspect, alone or in combination with one or more of the first through eighth aspects, each CBG of the CBGs of the TB include a first number of CBs, or a second number of CBs.

In a tenth aspect, alone or in combination with one or more of the first through ninth aspects, process 800 includes transmitting, to a transmitting device, an indication of receiving device support for receiving the TB having the multiple CBs mapped to resources of the TB in an FFPL mapping configuration, wherein the CBGs include the CB received on the first layer and the CB received on the second layer of the multi-layer communication link, or receiving, from the transmitting device, an indication of transmitting device support for transmitting the TB having the multiple CBs mapped to resources of the TB in an FFPL mapping configuration, wherein the CBGs include the CB received on the first layer and the CB received on the second layer of the multi-layer communication link.

In an eleventh aspect, alone or in combination with one or more of the first through tenth aspects, process 800 includes transmitting, to a transmitting device, an indication that the TB is to have the multiple CBs mapped to resources of the TB in an FFPL mapping configuration, wherein the CBGs include the CB received on the first layer and the CB received on the second layer of the multi-layer communication link, or receiving, from the transmitting device, an indication that the TB is to have the multiple CBs mapped to resources of the TB in an FFPL mapping configuration, wherein the CBGs include the CB received on the first layer and the CB received on the second layer of the multi-layer communication link.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a transmitting device, in accordance with the present disclosure. Example process 900 is an example where the transmitting device (e.g., base station 110 or UE 120) performs operations associated with code block grouping for frequency first per layer mapping.

As shown in FIG. 9, in some aspects, process 900 may include transmitting, via a multi-layer communication link, an indication of one or more parameters for grouping CBs of a TB into CBGs (block 910). For example, the transmitting device (e.g., using communication manager 140 or 150 and/or transmission component 1104, depicted in FIG. 11) may transmit, via a multi-layer communication link, an indication of one or more parameters for grouping CBs of a TB into CBGs, as described above.

As further shown in FIG. 9, in some aspects, process 900 may include transmitting the TB having multiple CBs mapped to resources of the TB in a FFPL mapping configuration, wherein the CBGs include a CB transmitted on a first layer and a CB transmitted on a second layer of the multi-layer communication link (block 920). For example, the transmitting device (e.g., using communication manager 140 or 150 and/or transmission component 1104, depicted in FIG. 11) may transmit the TB having multiple CBs mapped to resources of the TB in a FFPL mapping configuration, wherein the CBGs include a CB transmitted on a first layer and a CB transmitted on a second layer of the multi-layer communication link, as described above.

As further shown in FIG. 9, in some aspects, process 900 may include receiving HARQ-ACK feedback for the CBGs based at least in part on the grouping of the CBs (block 930). For example, the transmitting device (e.g., using communication manager 140 or 150 and/or reception component 1102, depicted in FIG. 11) may receive HARQ-ACK feedback for the CBGs based at least in part on the grouping of the CBS, as described above.

Process 900 may include additional aspects, such as any single aspect or any combination of aspects described below and/or in connection with one or more other processes described elsewhere herein.

In a first aspect, the CB transmitted on the first layer is transmitted on only the first layer, and wherein the CB transmitted on the second layer is transmitted on only the second layer.

In a second aspect, alone or in combination with the first aspect, the CB transmitted on the first layer and the CB transmitted on the second layer are consecutive CBs of the TB.

In a third aspect, alone or in combination with one or more of the first and second aspects, the CB transmitted on the first layer and the CB transmitted on the second layer are mapped to a same set of resource elements.

In a fourth aspect, alone or in combination with one or more of the first through third aspects, the transmitting device comprises a UE, a base station, or a network node.

In a fifth aspect, alone or in combination with one or more of the first through fourth aspects, the indication of the one or more parameters for grouping CBs of the TB into CBGs comprises an indication of a maximum number of CBGs for the TB, an indication of a number of spatial layers of the TB, or an indication of a number of CBs for the TB.

In a sixth aspect, alone or in combination with one or more of the first through fifth aspects, a number of the CBGs is based at least in part on a minimum value of a set that includes a maximum number of CBGs for the TB, and a quotient of a number of the CBs of the TB and a number of spatial layers of the TB.

In a seventh aspect, alone or in combination with one or more of the first through sixth aspects, a first CBG includes a first number of CBs and a second CBG includes a second number of CBs, wherein the first number is different from the second number.

In an eighth aspect, alone or in combination with one or more of the first through seventh aspects, each CBG of CBGs includes at least one CB in each layer of the TB.

In a ninth aspect, alone or in combination with one or more of the first through eighth aspects, each CBG of the CBGs of the TB include a first number of CBs, or a second number of CBs.

In a tenth aspect, alone or in combination with one or more of the first through ninth aspects, process 900 includes receiving, from a receiving device, an indication of receiving device support for receiving the TB having the multiple CBs mapped to resources of the TB in an FFPL mapping configuration, wherein the CBGs include the CB transmitted on the first layer and the CB transmitted on the second layer of the multi-layer communication link, or transmitting, to the receiving device, an indication of transmitting device support for transmitting the TB having the multiple CBs mapped to resources of the TB in an FFPL mapping configuration, wherein the CBGs include the CB transmitted on the first layer and the CB transmitted on the second layer of the multi-layer communication link.

In an eleventh aspect, alone or in combination with one or more of the first through tenth aspects, process 900 includes receiving, from a receiving device, an indication that the TB is to have the multiple CBs mapped to resources of the TB in an FFPL mapping configuration, wherein the CBGs include the CB transmitted on the first layer and the CB transmitted on the second layer of the multi-layer communication link, or transmitting, to the receiving device, an indication that the TB is to have the multiple CBs mapped to resources of the TB in an FFPL mapping configuration, wherein the CBGs include the CB transmitted on the first layer and the CB transmitted on the second layer of the multi-layer communication link.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
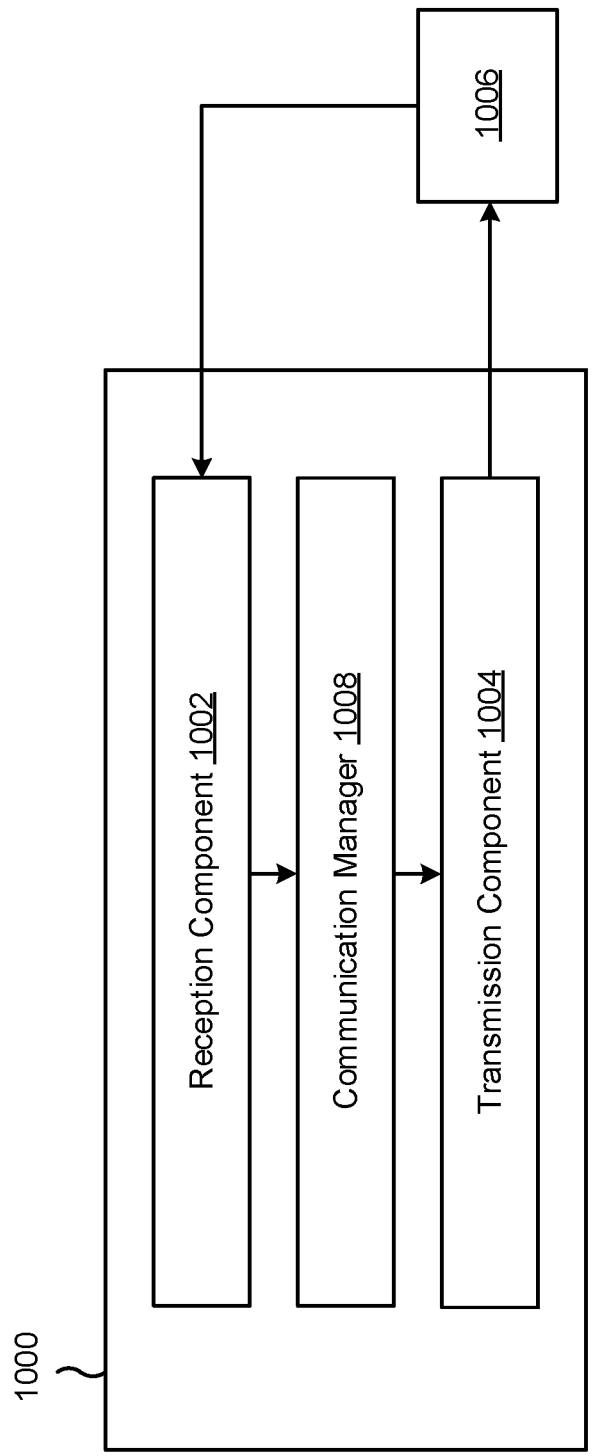
FIGS. 10 and 11 are diagrams of example apparatuses for wireless communication, in accordance with the present disclosure.

FIG. 10 is a diagram of an example apparatus 1000 for wireless communication. The apparatus 1000 may be a receiving device, or a receiving device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140 or 150).

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the receiving device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the receiving device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the receiving device described in connection with FIG. 2. In some aspects, the transmission component 1004 may be co-located with the reception component 1002 in a transceiver.

The reception component 1002 may receive, via a multi-layer communication link, an indication of one or more parameters for grouping CBs of a TB into CBGs. The reception component 1002 may receive the TB having multiple CBs mapped to resources of the TB in a FFPL mapping configuration, wherein the CBGs include a CB received on a first layer and a CB received on a second layer of the multi-layer communication link. The transmission component 1004 may transmit HARQ-ACK feedback for the CBGs based at least in part on the grouping of the CBs.

The transmission component 1004 may transmit, to a transmitting device, an indication of receiving device support for receiving the TB having the multiple CBs mapped to resources of the TB in an FFPL mapping configuration, wherein the CBGs include the CB received on the first layer and the CB received on the second layer of the multi-layer communication link.

The reception component 1002 may receive, from the transmitting device, an indication of transmitting device support for transmitting the TB having the multiple CBs mapped to resources of the TB in an FFPL mapping configuration, wherein the CBGs include the CB received on the first layer and the CB received on the second layer of the multi-layer communication link.

The transmission component 1004 may transmit, to a transmitting device, an indication that the TB is to have the multiple CBs mapped to resources of the TB in an FFPL mapping configuration, wherein the CBGs include the CB received on the first layer and the CB received on the second layer of the multi-layer communication link.

The reception component 1002 may receive, from the transmitting device, an indication that the TB is to have the multiple CBs mapped to resources of the TB in an FFPL mapping configuration, wherein the CBGs include the CB received on the first layer and the CB received on the second layer of the multi-layer communication link.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
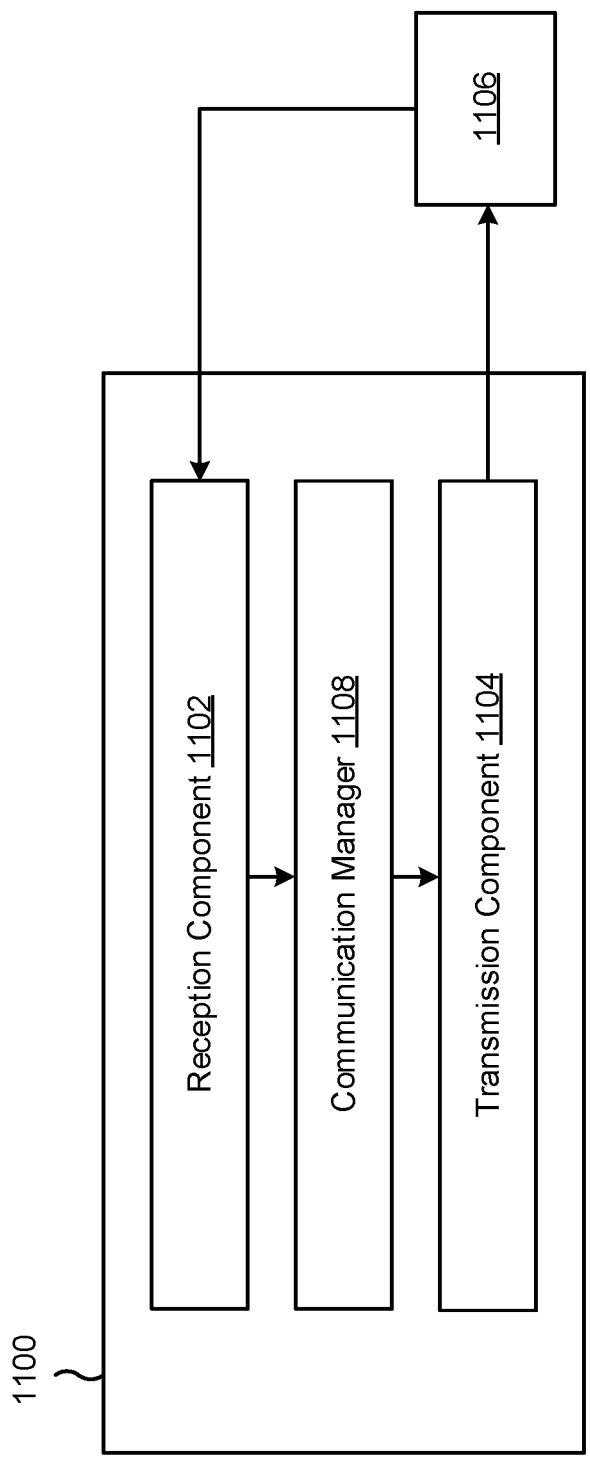

FIG. 11 is a diagram of an example apparatus 1100 for wireless communication. The apparatus 1100 may be a transmitting device, or a transmitting device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., communication manager 140 or 150).

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the transmitting device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the transmitting device described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the transmitting device described in connection with FIG. 2. In some aspects, the transmission component 1104 may be co-located with the reception component 1102 in a transceiver.

The transmission component 1104 may transmit, via a multi-layer communication link, an indication of one or more parameters for grouping CBs of a TB into CBGs. The transmission component 1104 may transmit the TB having multiple CBs mapped to resources of the TB in a FFPL mapping configuration, wherein the CBGs include a CB transmitted on a first layer and a CB transmitted on a second layer of the multi-layer communication link. The reception component 1102 may receive HARQ-ACK feedback for the CBGs based at least in part on the grouping of the CBs.

The reception component 1102 may receive, from a receiving device, an indication of receiving device support for receiving the TB having the multiple CBs mapped to resources of the TB in an FFPL mapping configuration, wherein the CBGs include the CB transmitted on the first layer and the CB transmitted on the second layer of the multi-layer communication link.

The transmission component 1104 may transmit, to the receiving device, an indication of transmitting device support for transmitting the TB having the multiple CBs mapped to resources of the TB in an FFPL mapping configuration, wherein the CBGs include the CB transmitted on the first layer and the CB transmitted on the second layer of the multi-layer communication link.

The reception component 1102 may receive, from a receiving device, an indication that the TB is to have the multiple CBs mapped to resources of the TB in an FFPL mapping configuration, wherein the CBGs include the CB transmitted on the first layer and the CB transmitted on the second layer of the multi-layer communication link.

The transmission component 1104 may transmit, to the receiving device, an indication that the TB is to have the multiple CBs mapped to resources of the TB in an FFPL mapping configuration, wherein the CBGs include the CB transmitted on the first layer and the CB transmitted on the second layer of the multi-layer communication link.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a receiving device, comprising: receiving, via a multi-layer communication link, an indication of one or more parameters for grouping code blocks (CBs) of a transport block (TB) into CB groups (CBGs); receiving the TB having multiple CBs mapped to resources of the TB in a frequency first per layer (FFPL) mapping configuration, wherein the CBGs include a CB received on a first layer and a CB received on a second layer of the multi-layer communication link; and transmitting hybrid automatic repeat request (HARQ)-acknowledgment (ACK) feedback for the CBGs based at least in part on the grouping of the CBs.

Aspect 2: The method of Aspect 1, wherein the CB received on the first layer is received on only the first layer, and wherein the CB received on the second layer is received on only the second layer.

Aspect 3: The method of any of Aspects 1-2, wherein the CB received on the first layer and the CB received on the second layer are consecutive CBs of the TB.

Aspect 4: The method of any of Aspects 1-3, wherein the CB received on the first layer and the CB received on the second layer are mapped to a same set of resource elements.

Aspect 5: The method of any of Aspects 1-4, wherein the receiving device comprises: a user equipment (UE), a base station, or a network node.

Aspect 6: The method of any of Aspects 1-5, wherein the indication of the one or more parameters for grouping CBs of the TB into CBGs comprises: an indication of a maximum number of CBGs for the TB, an indication of a number of spatial layers of the TB, or an indication of a number of CBs for the TB.

Aspect 7: The method of any of Aspects 1-6, wherein a number of the CBGs is based at least in part on a minimum value of a set that includes: a maximum number of CBGs for the TB, and a quotient of a number of the CBs of the TB and a number of spatial layers of the TB.

Aspect 8: The method of any of Aspects 1-7, wherein a first CBG includes a first number of CBs and a second CBG includes a second number of CBs, wherein the first number is different from the second number.

Aspect 9: The method of any of Aspects 1-8, wherein each CBG of CBGs includes at least one CB in each layer of the TB.

Aspect 10: The method of any of Aspects 1-9, wherein each CBG of the CBGs of the TB include: a first number of CBs, or a second number of CBs.

Aspect 11: The method of any of Aspects 1-10, further comprising: transmitting, to a transmitting device, an indication of receiving device support for receiving the TB having the multiple CBs mapped to resources of the TB in an FFPL mapping configuration, wherein the CBGs include the CB received on the first layer and the CB received on the second layer of the multi-layer communication link, or receiving, from the transmitting device, an indication of transmitting device support for transmitting the TB having the multiple CBs mapped to resources of the TB in an FFPL mapping configuration, wherein the CBGs include the CB received on the first layer and the CB received on the second layer of the multi-layer communication link.

Aspect 12: The method of any of Aspects 1-11, further comprising: transmitting, to a transmitting device, an indication that the TB is to have the multiple CBs mapped to resources of the TB in an FFPL mapping configuration, wherein the CBGs include the CB received on the first layer and the CB received on the second layer of the multi-layer communication link, or receiving, from the transmitting device, an indication that the TB is to have the multiple CBs mapped to resources of the TB in an FFPL mapping configuration, wherein the CBGs include the CB received on the first layer and the CB received on the second layer of the multi-layer communication link.

Aspect 13: A method of wireless communication performed by a transmitting device, comprising: transmitting, via a multi-layer communication link, an indication of one or more parameters for grouping code blocks (CBs) of a transport block (TB) into CB groups (CBGs); transmitting the TB having multiple CBs mapped to resources of the TB in a frequency first per layer (FFPL) mapping configuration, wherein the CBGs include a CB transmitted on a first layer and a CB transmitted on a second layer of the multi-layer communication link; and receiving hybrid automatic repeat request (HARQ)-acknowledgment (ACK) feedback for the CBGs based at least in part on the grouping of the CBs.

Aspect 14: The method of Aspect 13, wherein the CB transmitted on the first layer is transmitted on only the first layer, and wherein the CB transmitted on the second layer is transmitted on only the second layer.

Aspect 15: The method of any of Aspects 13-14, wherein the CB transmitted on the first layer and the CB transmitted on the second layer are consecutive CBs of the TB.

Aspect 16: The method of any of Aspects 13-15, wherein the CB transmitted on the first layer and the CB transmitted on the second layer are mapped to a same set of resource elements.

Aspect 17: The method of any of Aspects 13-16, wherein the transmitting device comprises: a user equipment (UE), a base station, or a network node.

Aspect 18: The method of any of Aspects 13-17, wherein the indication of the one or more parameters for grouping CBs of the TB into CBGs comprises: an indication of a maximum number of CBGs for the TB, an indication of a number of spatial layers of the TB, or an indication of a number of CBs for the TB.

Aspect 19: The method of any of Aspects 13-18, wherein a number of the CBGs is based at least in part on a minimum value of a set that includes: a maximum number of CBGs for the TB, and a quotient of a number of the CBs of the TB and a number of spatial layers of the TB.

Aspect 20: The method of any of Aspects 13-19, wherein a first CBG includes a first number of CBs and a second CBG includes a second number of CBs, wherein the first number is different from the second number.

Aspect 21: The method of any of Aspects 13-20, wherein each CBG of CBGs includes at least one CB in each layer of the TB.

Aspect 22: The method of any of Aspects 13-21, wherein each CBG of the CBGs of the TB include: a first number of CBs, or a second number of CBs.

Aspect 23: The method of any of Aspects 13-22, further comprising: receiving, from a receiving device, an indication of receiving device support for receiving the TB having the multiple CBs mapped to resources of the TB in an FFPL mapping configuration, wherein the CBGs include the CB transmitted on the first layer and the CB transmitted on the second layer of the multi-layer communication link, or transmitting, to the receiving device, an indication of transmitting device support for transmitting the TB having the multiple CBs mapped to resources of the TB in an FFPL mapping configuration, wherein the CBGs include the CB transmitted on the first layer and the CB transmitted on the second layer of the multi-layer communication link.

Aspect 24: The method of any of Aspects 13-23, further comprising: receiving, from a receiving device, an indication that the TB is to have the multiple CBs mapped to resources of the TB in an FFPL mapping configuration, wherein the CBGs include the CB transmitted on the first layer and the CB transmitted on the second layer of the multi-layer communication link, or transmitting, to the receiving device, an indication that the TB is to have the multiple CBs mapped to resources of the TB in an FFPL mapping configuration, wherein the CBGs include the CB transmitted on the first layer and the CB transmitted on the second layer of the multi-layer communication link.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A receiving device for wireless communication, comprising:
   one or more memories; and
   one or more processors coupled to the one or more memories, the one or more processors individually or collectively configured to:
      receive, via a multi-layer communication link, an indication of one or more parameters for grouping code blocks (CBs) of a transport block (TB) into CB groups (CBGs);
      receive the TB having multiple CBs mapped to resources of the TB in a frequency first per layer (FFPL) mapping configuration, wherein a first CBG of the CBGs includes a first CB received on a first layer and a second CB received on a second layer of the multi-layer communication link; and
      transmit hybrid automatic repeat request (HARQ)-acknowledgment (ACK) feedback for the CBGs based at least in part on the grouping of the CBs.

2. The receiving device of claim 1, wherein the first CB is received on only the first layer, and
   wherein the second CB is received on only the second layer.

3. The receiving device of claim 1, wherein the first CB and the second CB are consecutive CBs of the TB.

4. The receiving device of claim 1, wherein the first CB and the second CB are mapped to a same set of resource elements.

5. The receiving device of claim 1, wherein the receiving device comprises:
   a user equipment (UE),
   a base station, or
   a network node.

6. The receiving device of claim 1, wherein the indication of the one or more parameters for grouping CBs of the TB into CBGs comprises:
   an indication of a maximum number of CBGs for the TB,
   an indication of a number of spatial layers of the TB, or
   an indication of a number of CBs for the TB.

7. The receiving device of claim 1, wherein a number of the CBGs is based at least in part on a minimum value of a set that includes:
   a maximum number of CBGs for the TB, and
   a quotient of a number of the CBs of the TB and a number of spatial layers of the TB.

8. The receiving device of claim 1, wherein the first CBG includes a first number of CBs, and wherein a second CBG of the CBGs includes a second number of CBs, wherein the first number is different from the second number.

9. The receiving device of claim 1, wherein each CBG of the CBGs includes at least one CB in each layer of the TB.

10. The receiving device of claim 1, wherein each CBG of the CBGs of the TB include:
    a first number of CBs, or
    a second number of CBs.

11. The receiving device of claim 1, wherein the one or more processors are further configured to:
    transmit, to a transmitting device, an indication of receiving device support for receiving the TB having the multiple CBs mapped to resources of the TB in an FFPL mapping configuration, or
    receive, from the transmitting device, an indication of transmitting device support for transmitting the TB having the multiple CBs mapped to resources of the TB in an FFPL mapping configuration.

12. The receiving device of claim 1, wherein the one or more processors are further configured to:
    transmit, to a transmitting device, an indication that the TB is to have the multiple CBs mapped to resources of the TB in an FFPL mapping configuration, or
    receive, from the transmitting device, an indication that the TB is to have the multiple CBs mapped to resources of the TB in an FFPL mapping configuration.

13. A transmitting device for wireless communication, comprising:
    one or more memories; and
    one or more processors coupled to the one or more memories, the one or more processors individually or collectively configured to:
       transmit, via a multi-layer communication link, an indication of one or more parameters for grouping code blocks (CBs) of a transport block (TB) into CB groups (CBGs);
       transmit the TB having multiple CBs mapped to resources of the TB in a frequency first per layer (FFPL) mapping configuration, wherein a first CBG of the CBGs includes a first CB transmitted on a first layer and a second CB transmitted on a second layer of the multi-layer communication link; and
       receive hybrid automatic repeat request (HARQ)-acknowledgment (ACK) feedback for the CBGs based at least in part on the grouping of the CBs.

14. The transmitting device of claim 13, wherein the first CB is transmitted on only the first layer, and
    wherein the second CB is transmitted on only the second layer.

15. The transmitting device of claim 13, wherein the first CB and the second CB are consecutive CBs of the TB.

16. The transmitting device of claim 13, wherein the first CB and the second CB are mapped to a same set of resource elements.

17. The transmitting device of claim 13, wherein the transmitting device comprises:
    a user equipment (UE),
    a base station, or
    a network node.

18. The transmitting device of claim 13, wherein the indication of the one or more parameters for grouping CBs of the TB into CBGs comprises:
    an indication of a maximum number of CBGs for the TB,
    an indication of a number of spatial layers of the TB, or
    an indication of a number of CBs for the TB.

19. The transmitting device of claim 13, wherein a number of the CBGs is based at least in part on a minimum value of a set that includes:
   a maximum number of CBGs for the TB, and
   a quotient of a number of the CBs of the TB and a number of spatial layers of the TB.

20. The transmitting device of claim 13, wherein the first CBG includes a first number of CBs, and wherein a second CBG of the CBGs includes a second number of CBs,
   wherein the first number is different from the second number.

21. The transmitting device of claim 13, wherein each CBG of the CBGs includes at least one CB in each layer of the TB.

22. The transmitting device of claim 13, wherein each CBG of the CBGs of the TB include:
   a first number of CBs, or
   a second number of CBs.

23. The transmitting device of claim 13, wherein the one or more processors are further configured to:
   receive, from a receiving device, an indication of receiving device support for receiving the TB having the multiple CBs mapped to resources of the TB in an FFPL mapping configuration or
   transmit, to the receiving device, an indication of transmitting device support for transmitting the TB having the multiple CBs mapped to resources of the TB in an FFPL mapping configuration.

24. The transmitting device of claim 13, wherein the one or more processors are further configured to:
   receive, from a receiving device, an indication that the TB is to have the multiple CBs mapped to resources of the TB in an FFPL mapping configuration, or
   transmit, to the receiving device, an indication that the TB is to have the multiple CBs mapped to resources of the TB in an FFPL mapping configuration.

25. A method of wireless communication performed by a receiving device, comprising:
   receiving, via a multi-layer communication link, an indication of one or more parameters for grouping code blocks (CBs) of a transport block (TB) into CB groups (CBGs);
   receiving the TB having multiple CBs mapped to resources of the TB in a frequency first per layer (FFPL) mapping configuration, wherein a first CBG of the CBGs includes a first CB received on a first layer and a second CB received on a second layer of the multi-layer communication link; and
   transmitting hybrid automatic repeat request (HARQ)-acknowledgment (ACK) feedback for the CBGs based at least in part on the grouping of the CBs.

26. The method of claim 25, wherein the indication of the one or more parameters for grouping CBs of the TB into CBGs comprises:
   an indication of a maximum number of CBGs for the TB,
   an indication of a number of spatial layers of the TB, or
   an indication of a number of CBs for the TB.

27. The method of claim 25, wherein a number of the CBGs is based at least in part on a minimum value of a set that includes:
   a maximum number of CBGs for the TB, and
   a quotient of a number of the CBs of the TB and a number of spatial layers of the TB.

28. A method of wireless communication performed by a transmitting device, comprising:
   transmitting, via a multi-layer communication link, an indication of one or more parameters for grouping code blocks (CBs) of a transport block (TB) into CB groups (CBGs);
   transmitting the TB having multiple CBs mapped to resources of the TB in a frequency first per layer (FFPL) mapping configuration, wherein a first CBG of the CBGs includes a first CB transmitted on a first layer and a second CB transmitted on a second layer of the multi-layer communication link; and
   receiving hybrid automatic repeat request (HARQ)-acknowledgment (ACK) feedback for the CBGs based at least in part on the grouping of the CBs.

29. The method of claim 28, wherein the indication of the one or more parameters for grouping CBs of the TB into CBGs comprises:
   an indication of a maximum number of CBGs for the TB,
   an indication of a number of spatial layers of the TB, or
   an indication of a number of CBs for the TB.

30. The method of claim 28, wherein a number of the CBGs is based at least in part on a minimum value of a set that includes:
   a maximum number of CBGs for the TB, and
   a quotient of a number of the CBs of the TB and a number of spatial layers of the TB.

* * * * *